United States Patent [19]
Suzuki

[11] Patent Number: 5,815,817
[45] Date of Patent: Sep. 29, 1998

[54] INFORMATION BROADCASTING METHOD

[75] Inventor: Kazuhiro Suzuki, Fujiyoshida, Japan

[73] Assignee: Kokusai Electric Co., Ltd., Tokyo, Japan

[21] Appl. No.: 689,104

[22] Filed: Jul. 30, 1996

[30] Foreign Application Priority Data

Jul. 31, 1995 [JP] Japan .................................. 7-195284

[51] Int. Cl.⁶ .................................................. H04Q 9/00
[52] U.S. Cl. ...................... 455/509; 455/510; 455/512; 455/416; 455/450
[58] Field of Search ................................ 455/509, 512, 455/404, 416, 450

[56] References Cited

U.S. PATENT DOCUMENTS

| | | | |
|---|---|---|---|
| 5,093,924 | 3/1992 | Toshiyuki et al. ........................ | 455/54 |
| 5,343,511 | 8/1994 | Osada ...................................... | 455/450 |
| 5,507,008 | 4/1996 | Kanai et al. .............................. | 455/512 |
| 5,719,619 | 10/1995 | Hattori et al. ............................ | 455/2 |

*Primary Examiner*—David R. Hudspeth
*Assistant Examiner*—Daniel Abebe
*Attorney, Agent, or Firm*—Antonelli, Terry, Stout & Kraus, LLP

[57] ABSTRACT

An information broadcasting method for a communication system including a plurality of stations. The communication system enables any two of the stations to communicate with one another. The communication system includes a conference trunk having at least four channels. One of the channels is an information broadcasting channel for use only in an information broadcasting operation wherein any one of the stations broadcasts information to all of the stations simultaneously via the information broadcasting channel. All other ones of the channels are conference communication channels for use in conference communication wherein any three or more of the stations communicate with one another simultaneously via any three or more of the conference communication channels. During an information broadcasting operation, any one of the stations which is receiving broadcast information from another one of the stations can transmit information to all of the stations in the system, including the station which is broadcasting information, via a vacant conference communication channel in the conference trunk, thereby engaging in bidirectional communication with the station which is broadcasting information during the information broadcasting operation.

14 Claims, 9 Drawing Sheets

INFORMATION BROADCASTING METHOD

BACKGROUND OF THE INVENTION

1. Field of the Invention

The present invention relates to an information broadcasting method, and in particular to an information broadcasting method suitable for broadcasting information in a situation such as an emergency.

2. Description of the Related Art

FIG. 9 shows a conventional wireless mobile communication system including base stations 931 and 932 and mobile stations 941 and 942 located within a cell 921, base stations 933 and 934 and a mobile station 943 located within a cell 922, and base stations 935 and 936 and mobile stations 944, 945, and 946 located within a cell 923. The mobile stations 941–946 communicate with the base stations 931–936 via radio signals, for example.

A system control circuit 910 controls transmission of signals between the base stations 931–936 and the mobile stations 941–946, and establishes connections between various ones of the mobile stations 941–946, such as, for example, between the mobile stations 942 and 945 via, for example, the base stations 932 and 936.

The system in FIG. 9 may be, for example, a cellular telephone system, or a personal handyphone system (PHS) of the type recently developed in Japan.

The system in FIG. 9 may also include fixed stations connected to the system control circuit 910 by wires, for example. In this case, the system control circuit 910 can also establish connections between the mobile stations 941–946 and the fixed stations.

The system in FIG. 9 may be connected to another communication system, such as a public communication system, or a private communication system in a business, via the system control circuit 910. One example of such a public communication system is a public telephone system, and one example of such a private communication system is a private telephone system having a private branch exchange (PBX). In this case, the system control circuit 910 can also establish connections between the mobile stations 941–946 and stations in the other communication system.

The system in FIG. 9 may provide the capability of broadcasting information from one of the mobile stations 941–946 to all of the other ones of the mobile stations 941–946 simultaneously.

If the system in FIG. 9 includes fixed stations as described above, the system in FIG. 9 may also provide the capability of broadcasting information from one of the fixed stations to all of the mobile stations 941–946 simultaneously.

If the system in FIG. 9 is connected to another communication system as described above, the system in FIG. 9 may also provide the capability of broadcasting information from one of the stations in the other communication system to all of the mobile stations 941–946 simultaneously.

In order to broadcast information in the system in FIG. 9, one station, whether it be one of the mobile stations 941–946, one of the fixed stations described above, or one of the stations in another communication system described above, initiates an information broadcasting operation by transmitting an information broadcasting instruction to the system control circuit 910.

When the system control circuit 910 receives the information broadcasting instruction, it instructs the base stations 931–936 to transmit the information broadcasting instruction at a specific time on one radio channel to the mobile stations 941–946, such that the mobile stations 941–946 receive the information broadcasting instruction simultaneously.

When the mobile stations 941–946 receive the information broadcasting instruction, they enter a broadcast information receiving state in which they simultaneously receive information, such as voice signals or data, from the station which issued the information broadcasting instruction via the system control circuit 910 and the base stations 931–936.

If the station which initiated the information broadcasting operation is one of the mobile stations 941–946, it does not enter the broadcast information receiving state when it receives the information broadcasting instruction, but remains in a normal state so that it can broadcast information to the other ones of the mobile stations 941–946.

When the station which initiated the information broadcasting operation is finished broadcasting information to the mobile stations 941–946, it terminates the information broadcasting operation, for example, by transmitting an information broadcasting terminating instruction to the mobile stations 941–946 via the system control circuit 910 and the base stations 931–936. When the mobile stations 941–946 receive the information broadcasting terminating instruction, they return to an idle state.

The information broadcasting method described above is not limited to a mobile communication system as shown in FIG. 9, but is also applicable to a private communication system in a business, such as the private telephone system having a PBX described above, and to a personal communication system, such as a personal telephone system.

SUMMARY OF THE INVENTION

During an information broadcasting operation performed according to the prior-art information broadcasting method described above, it is only possible to communicate in one direction, i.e. from the station which initiated the information broadcasting operation to the other stations in the system. Thus, while the station which initiated the information broadcasting operation can communicate with the other stations in the system, the other stations in the system cannot communicate with the station which initiated the information broadcasting operation or with one other.

However, this is disadvantageous because an information broadcasting operation is frequently used to broadcast information during an emergency, and it is often necessary for one of the stations which is receiving broadcast information to transmit information requested by the station which initiated the information broadcasting operation back to that station during the information broadcasting operation, or to communicate with another station in the system which is also receiving broadcast information.

It is been proposed to use a conventional communication system providing the capability of making conference calls among three or more stations to perform an information broadcasting operation in which bidirectional communication between a station receiving broadcast information and a station which initiated the information broadcasting operation is possible during the information broadcasting operation, and to enable two stations which are receiving broadcast information to communicate with one another during the information broadcasting operation.

However, in the conventional communication system providing the capability of making conference calls, it is impossible for all of the stations to be connected to the system simultaneously as is required during an information broadcasting operation due to an insufficient number of available channels and/or problems caused by howling.

Accordingly, an object of the present invention is to provide an information broadcasting method which enables bidirectional communication during an information broadcasting operation between a station receiving broadcast information and a station which initiated the information broadcasting operation, and enables two stations which are receiving broadcast information to communicate with one another during the information broadcasting operation.

An information broadcasting method according to the present invention is for a communication system including a plurality of stations and enabling any two of the stations to communicate with one another. The information broadcasting method includes the steps of providing the communication system with a conference trunk having at least four channels, each of the channels having an input and an output normally unconnected to the input, assigning one of the channels to be an information broadcasting channel for use only in information broadcasting wherein any one of the stations broadcasts information to all of the stations simultaneously via the information broadcasting channel after the one station issues an information broadcasting instruction, assigning all other ones of the channels to be conference communication channels for use in conference communication wherein any three or more of the stations communicate with one another simultaneously via any three or more of the conference communication channels after any one of the three or more stations issues a conference communication instruction, issuing the information broadcasting instruction from any one of the stations, connecting the station which issued the information broadcasting instruction to the input of the information broadcasting channel in response to the information broadcasting instruction, connecting the output of the information broadcasting channel to the input of the information broadcasting channel in response to the information broadcasting instruction, connecting all of the stations to the output of the information broadcasting channel in response to the information broadcasting instruction, thereby connecting the station which issued the information broadcasting instruction to all of the stations via the information broadcasting channel, broadcasting information from the station which issued the information broadcasting instruction to all of the stations via the information broadcasting channel, issuing a conference communication instruction from any one of the stations except the station which issued the information broadcasting instruction while the station which issued the information broadcasting instruction is broadcasting information to all of the stations, connecting the station which issued the conference communication instruction to the output of the information broadcasting channel in response to the conference communication instruction, thereby connecting the station which issued the conference communication instruction to all of the stations via the information broadcasting channel, and transmitting information from the station which issued the conference communication request to all of the stations via the information broadcasting channel, thereby engaging in bidirectional communication with the station which issued the information broadcasting instruction while the station which issued the information broadcasting instruction is broadcasting information to all of the stations.

DESCRIPTION OF THE PREFERRED EMBODIMENTS

Figure 1:
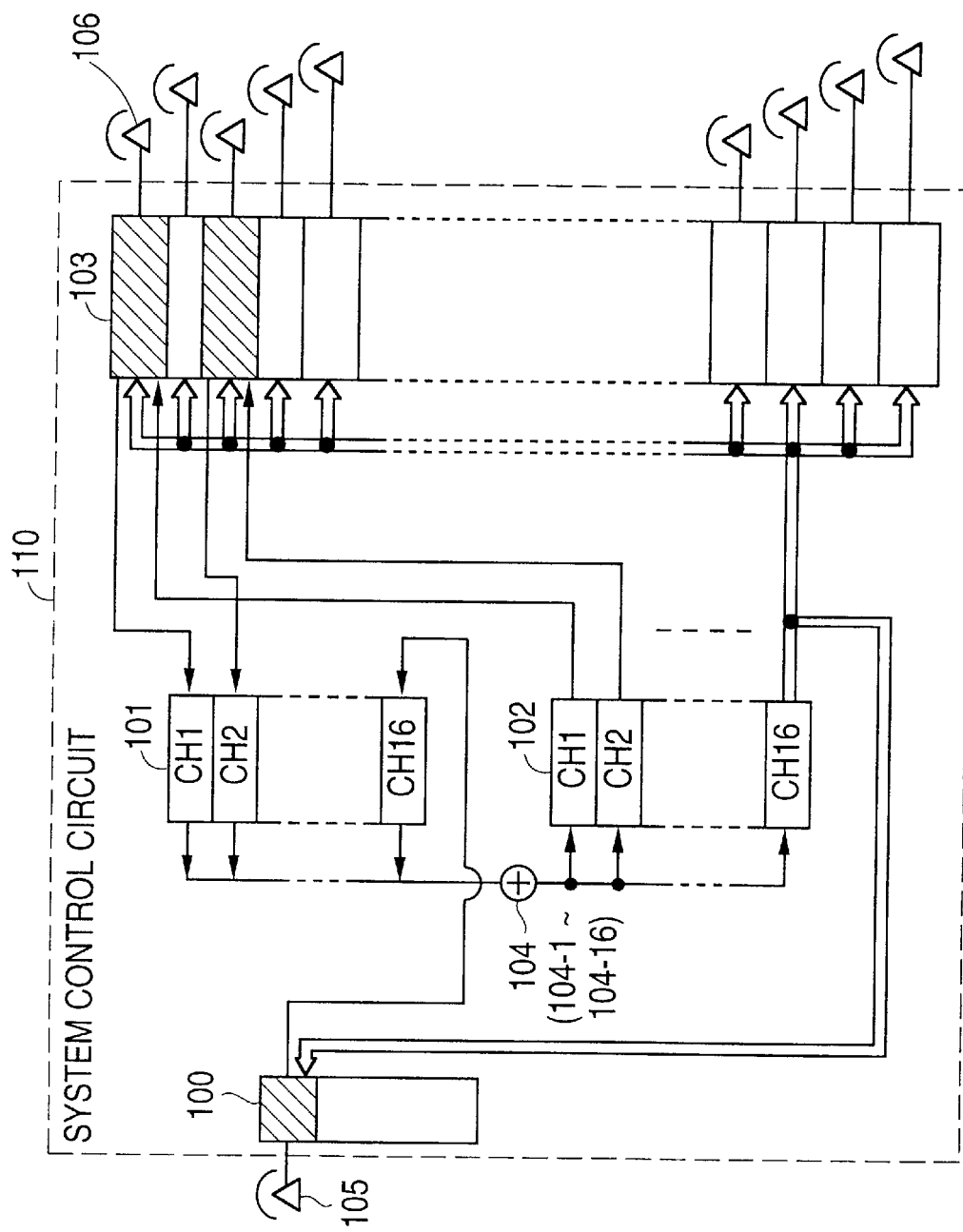
FIG. 1 shows an example of a circuit configuration for performing an information broadcasting method according to the present invention in a wired communication system.

Preferred embodiments of the present invention are described in detail below with reference to the drawings, in which like elements are identified by like reference numerals.

FIG. 1 shows an example of a circuit configuration for performing an information broadcasting method according to the present invention in a wired communication system providing the capability of making conference calls among three or more stations, such as a private communication system in a business. One example of such a private communication system is a private telephone system including a private branch exchange (PBX).

The system in FIG. 1 includes stations 105 and 106 connected by wires to respective communication line switches 100 and 103. Although the communication line switch 100 and the station 105 are separated from the communication line switches 103 and the stations 106 and are identified by different reference numerals to facilitate the explanation of the present invention, there is actually no difference between them.

A system control circuit 110 controls the communication line switches 100 and 103 to enable stations 105 and 106 to communicate with one another in various types of calls, such as a two-way call in which two of the stations 105 and 106 communicate with one another, a conference call in which three or more of the stations 105 and 106 communicate with one another simultaneously, and an information broadcasting call in which one of the stations 105 and 106 broadcasts information to at least one other one of the stations 105 and 106.

The information broadcasting call may be one of two types. In a first type of information broadcasting call, one of the stations 105 and 106 broadcasts information to all of the other ones of the stations 105 and 106 simultaneously after the system control circuit 110 has interrupted any calls in which the other ones of the stations 105 and 106 are already participating. In a second type of information broadcasting call, one of the stations 105 and 106 broadcasts information only to other ones of the stations 105 and 106 which are not already participating in a call, and the system control circuit 110 does not interrupt any calls in which the other ones of the stations 105 and 106 are already participating.

The system control circuit 110 may provide the stations 105 and 106 with the capability of making either the first type or the second type of information broadcasting call, or may provide the stations 105 and 106 with the capability of making both the first type and the second type of information broadcasting call.

The system control circuit 110 has a plurality of switching channels which it uses to connect various ones of the communication line switches 100 and 103 to one another or to channels in a conference trunk which is described below during the various types of calls described above. These switching channels are conventional, and are not explicitly shown in FIG. 1.

During a two-way call, the system control circuit 110 enables two of the stations 105 and 106 to communicate with one another by connecting the corresponding ones of the communication line switches 100 and 103 to one another via a vacant switching channel.

In order to provide the capability of making conference calls and information broadcasting calls, the system in FIG. 1 includes a conference trunk with N channels having an input portion 101 and an output portion 102, and N adders 104 respectively corresponding to the N channels of the conference trunk. For simplicity of illustration, the adders 104 are represented by a single symbol in FIG. 1. The number of channels N of the conference trunk is typically less than the number of the communication line switches 100 and 103.

One of the N channels of the conference trunk is used only for making information broadcasting calls, i.e. is dedicated to making only information broadcasting calls, and the one of the N adders 104 corresponding to this one channel of the conference trunk has N inputs. The other ones of the adders 104 respectively corresponding to the other ones of the N channels each have N-1 inputs.

In the specific example in FIG. 1, the number of channels N of the conference trunk N is sixteen, and thus the conference trunk includes sixteen channels CH1, CH2, . . . CH16 as shown in the input portion 101 of the conference trunk and the output portion 102 of the conference trunk, and there are sixteen adders 104. The channel CH16 of the conference trunk is dedicated to making only information broadcasting calls, and the one of the adders 104 corresponding to the channel CH16 of the conference trunk has sixteen inputs and is represented by reference numeral 104-16 in FIG. 1. The other fifteen of the adders 104 respectively corresponding to the channels CH1–CH15 of the conference trunk each have fifteen inputs, and are respectively represented by reference numerals 104-1 to 104-15 in FIG. 1.

Adder 104-16 corresponding to the channel CH16 of the conference trunk which is dedicated to making only information broadcasting calls has an output connected to the channel CH16 of the output portion 102 of the conference trunk, and has sixteen inputs respectively connected to the channels CH1–CH16 of the input portion 101 of the conference trunk.

Figure 2:
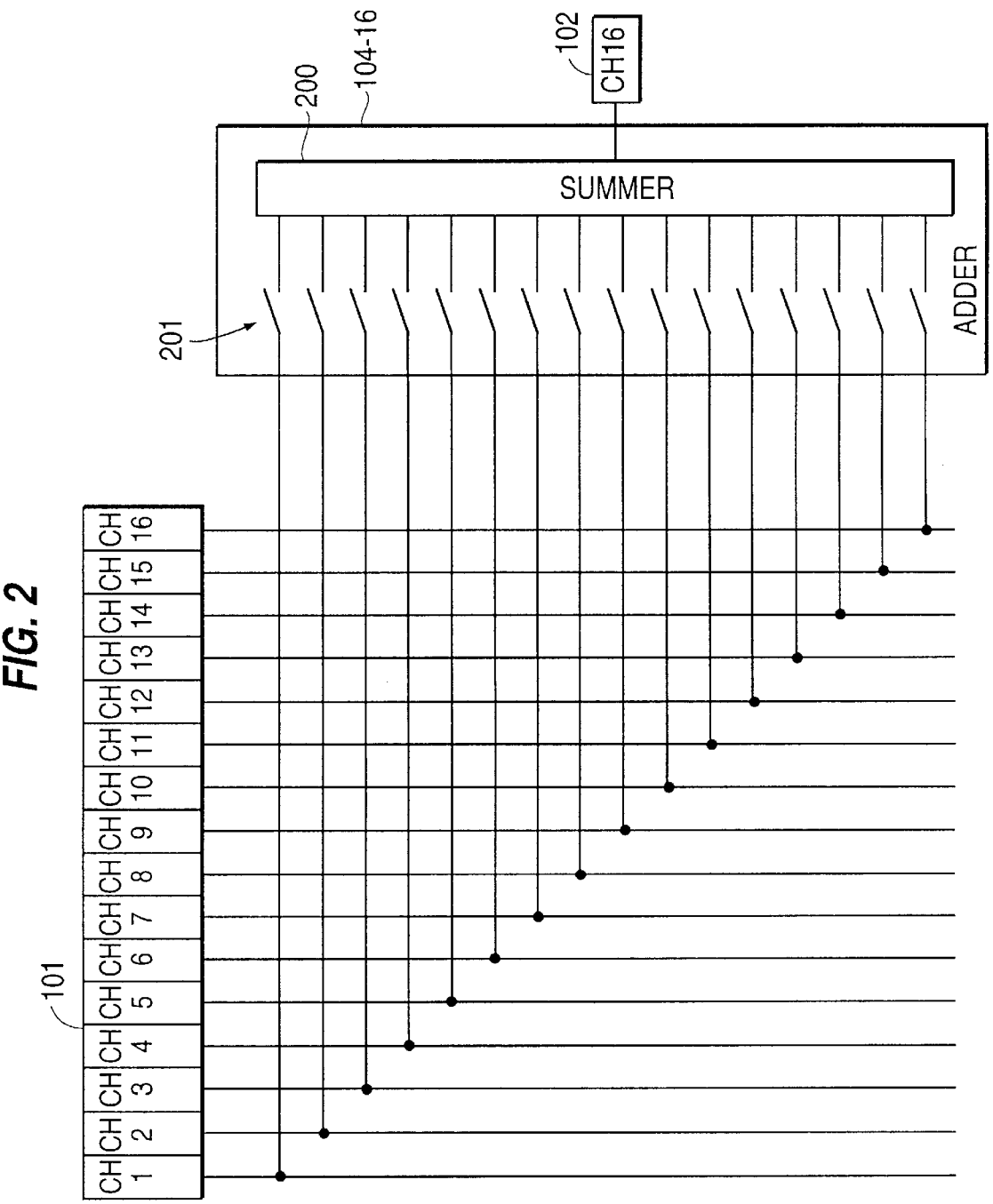
FIG. 2 shows a schematic representation of an adder corresponding to a channel of a conference trunk which is dedicated to making only information broadcasting calls.

FIG. 2 shows a schematic representation of the adder 104-16 corresponding to the channel CH16 of the conference trunk. The adder 104-16 includes a summer 200 and switches 201 for controlling which signals from the channels CH1–CH16 of the input portion 101 of the conference trunk are actually input to the summer 200 to be added together and output to the channel CH16 of the output portion 102 of the conference trunk at any given time. The system control circuit 110 controls switches 201 during information broadcasting calls as described below.

However, it is noted that FIG. 2 merely shows a schematic representation, and it will be apparent to one of ordinary skill in the art that the actual adder 104-16 itself can be implemented in a variety of well-known ways.

Each of the fifteen adders 104-1 to 104-15 respectively corresponding to the channels CH1–CH15 of the conference trunk has an output connected to a respective one of the channels CH1–CH16 of the output portion 102 of the conference trunk, and has fifteen inputs respectively connected to the other ones of the channels CH1–CH16 of the input portion 101 of the conference trunk.

For example, the adder 104-1 corresponding to the channel CH1 of the conference trunk has an output connected to the channel CH1 of the output portion 102 of the conference trunk, and has fifteen inputs respectively connected to the channels CH2–CH16 of the input portion 101 of the conference trunk, and the adder 104-15 corresponding to the channel CH15 of the conference trunk has an output connected to the channel CH15 of the output portion 102 of the conference trunk, and has fifteen inputs respectively connected to the channels CH1–CH14 and CH16 of the input portion 101 of the conference trunk. The adders 104-2 to 104-14 respectively corresponding to the channels CH2–CH14 of the conference trunk have a similar configuration.

Figure 3:
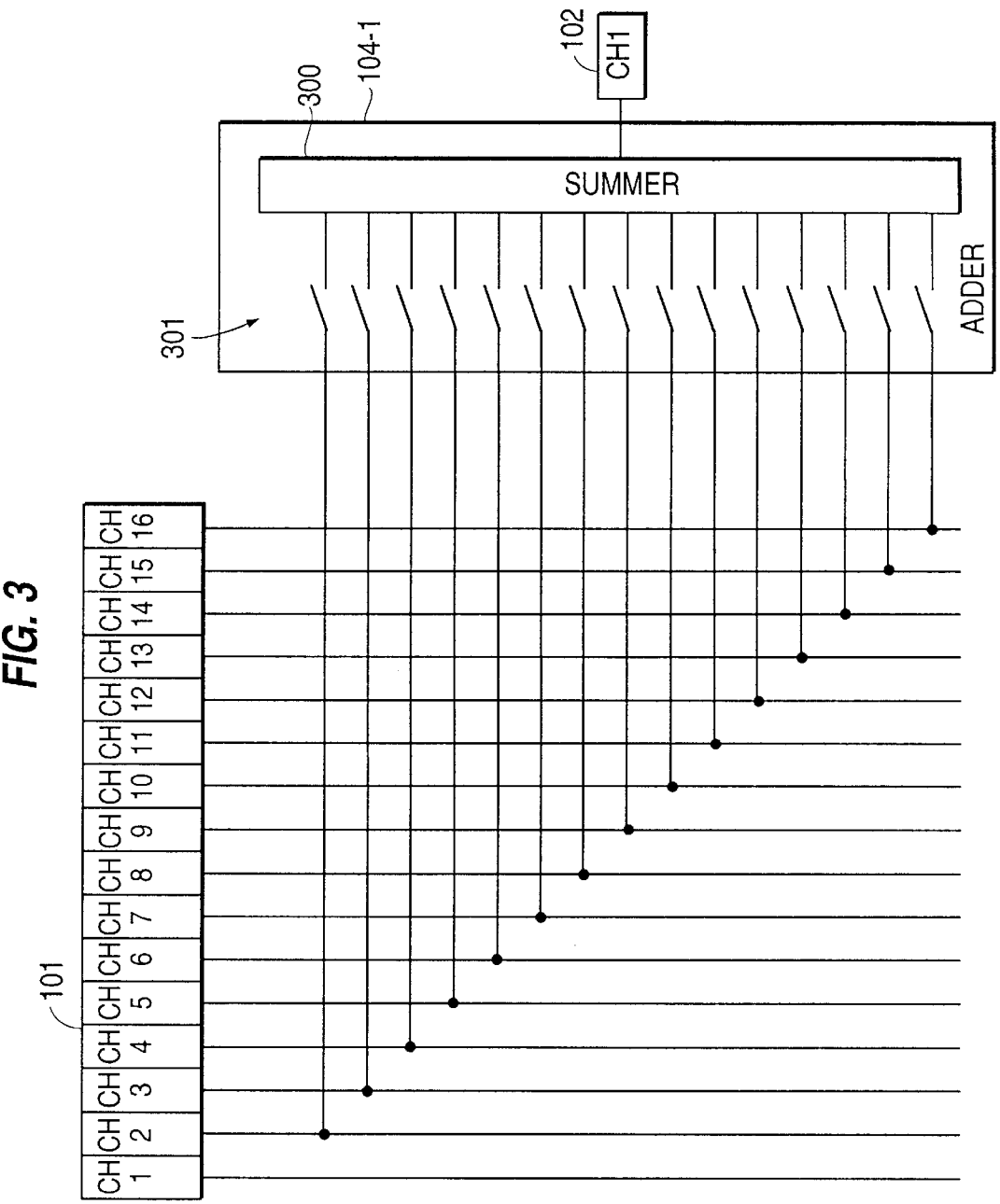
FIG. 3 shows a schematic representation of an adder corresponding to a channel of a conference trunk which is used for making conference calls.

FIG. 3 shows a schematic representation of the adder 104-1 corresponding to the channel CH1 of the conference trunk. The adder 104-1 includes a summer 300 and switches 301 for controlling which signals from the channels CH2–CH15 of the input portion 101 of the conference trunk are actually input to the summer 300 to be added together and output to the channel CH1 of the output portion 102 of the conference trunk at any given time. The system control circuit 110 controls switches 301 during conference calls and information broadcasting calls as described below. The adders 104-2 to 104-15 respectively corresponding to the channels CH2–CH15 of the conference trunk can be represented by a schematic representation similar to that in FIG. 3 also having a summer 300 and switches 301.

However, it is noted that FIG. 3 merely shows a schematic representation, and it will be apparent to one of ordinary skill in the art that the actual adders 104-1 to 104-15 themselves can be implemented in a variety of well-known ways.

During a conference call, the system control circuit 110 enables three or more of the stations 105 and 106 to communicate with one another by connecting the corresponding ones of the communication line switches 100 and 103 to respective ones of the channels of the conference trunk via respective vacant switching channels, and by controlling corresponding ones of the adders 104.

When one of stations 105 and 106 initiates a conference call, for example, when a user of the station initiating the conference call dials a special number assigned to conference calls, the station initiating the conference call transmits a conference call instruction to the system control circuit 110. When the system control circuit 110 receives the conference call instruction, it sets up the conference call as described below.

For example, during a three-way conference call among three of the stations 105 and 106, the system control circuit 110 connects a first one of the communication line switches 105 and 106 corresponding to a first one of the three stations to the channel CH1 of the input portion 101 of the conference trunk and the channel CH1 of the output portion 102 of the conference trunk via respective vacant switching channels, connects a second one of the communication line switches 105 and 106 corresponding to a second one of the three stations to the channel CH2 of the input portion 101 of the conference trunk and the channel CH2 of the output portion 102 of the conference trunk via respective vacant switching channels, and connects a third one of the communication line switches 105 and 106 corresponding to a third one of the three stations to the channel CH3 of the input portion 101 of the conference trunk and the channel CH3 of the output portion 102 of the conference trunk via respective vacant switching channels.

The system control circuit 110 controls the adders 104 during a conference call such that signals from only the channels of the input portion 101 of the conference trunk which are being used in the conference call are added together and output to only respective ones of the channels of the output portion 102 of the conference trunk which are being used in the conference call.

For example, during the three-way conference call described above, the system control circuit 110 controls the switches 301 of the adder 104-1 corresponding to the channel CH1 of the conference trunk such that the summer 300 of the adder 104-1 adds together signals from only the channels CH2 and CH3 of the input portion 101 of the conference trunk and outputs the added signals to the channel CH1 of the output portion 102 of the conference trunk, controls the switches 301 of the adder 104-2 corresponding to the channel CH2 of the conference trunk such that the summer 300 of the adder 104-2 adds together signals from only the channels CH1 and CH3 of the input portion 101 of the conference trunk and outputs the added signals to the channel CH2 of the output portion 102 of the conference trunk, and controls the switches 301 of the adder 104-3 corresponding to the conference trunk such that the summer 300 of the adder 104-3 adds together signals from only the channels CH1 and CH2 of the input portion 101 of the conference trunk and outputs the added signals to the channel CH3 of the output portion 102 of the conference trunk.

If the system in FIG. 1 is a private telephone system having a PBX, the system control circuit 110, the communication line switches 100 and 103, the conference trunk having the input portion 101 and the output portion 102, and the adders 104 are located in the PBX.

Although the circuit configuration in FIG. 1 for performing an information broadcasting method according to the present invention is similar to the circuit configuration of a conventional wired communication system providing the capability of making conference calls, an important difference between the circuit configuration in FIG. 1 and the conventional circuit configuration is that in the circuit configuration in FIG. 1, one of the N channels of the conference trunk is used only for making information broadcasting calls, i.e. is dedicated to making only information broadcasting calls, as described above. In the specific example in FIG. 1, the channel CH16 of the conference trunk is dedicated to making only information broadcasting calls as described above.

Each station participating in a conference call uses one channel of the conference trunk. Since a conference call is a call in which three or more stations communicate with one another simultaneously, the conference trunk must have at least three channels which are available for making conference calls.

Thus, in the conventional circuit configuration which does not have one channel of the conference trunk dedicated to making only information broadcasting calls, the conference trunk must have at least three channels, all of which are available for making conference calls.

However, in the circuit configuration for performing an information broadcasting method according to the present invention, since one channel of the conference trunk is dedicated to making only information broadcasting calls, the conference trunk must have at least four channels, i.e. one channel which is dedicated to making only information broadcasting calls, and at least three channels which are available for making conference calls.

All of the stations 105 and 106 have the capability of making an information broadcasting call, which may be of either the first type or the second type described above. In the specific example in FIG. 1, the station 105 has made an information broadcasting call of the first type, i.e. an information broadcasting call in which the station 105 broadcasts information to all of the stations 106 simultaneously after the system control circuit 110 has interrupted any calls in which the stations 106 were already participating.

The channel CH16 of the output portion 102 of the conference trunk which is dedicated to making only information broadcasting calls is physically connected to all of the communication line switches 100 and 103 as indicated by the double lines in FIG. 1. This physical connection makes it unnecessary for the system control circuit 110 to use vacant switching channels to connect the channel CH16 of the output portion 102 of the conference trunk to all of the communication line switches 100 and 103 during an information broadcasting call.

However, even though the channel CH16 of the output portion 102 of the conference trunk is physically connected to all of the communication line switches 100 and 103, the system control circuit 110 can control the physical connection such that a signal from the channel CH16 of the output portion 102 of the conference trunk will be transmitted to the communication line switches 100 and 103 only during an information broadcasting call. During any other type of call, the system control circuit 110 can control the physical connection such that a signal from the channel CH16 of the output portion 102 of the conference trunk will not be transmitted to the communication line switches 100 and 103.

Figure 4:
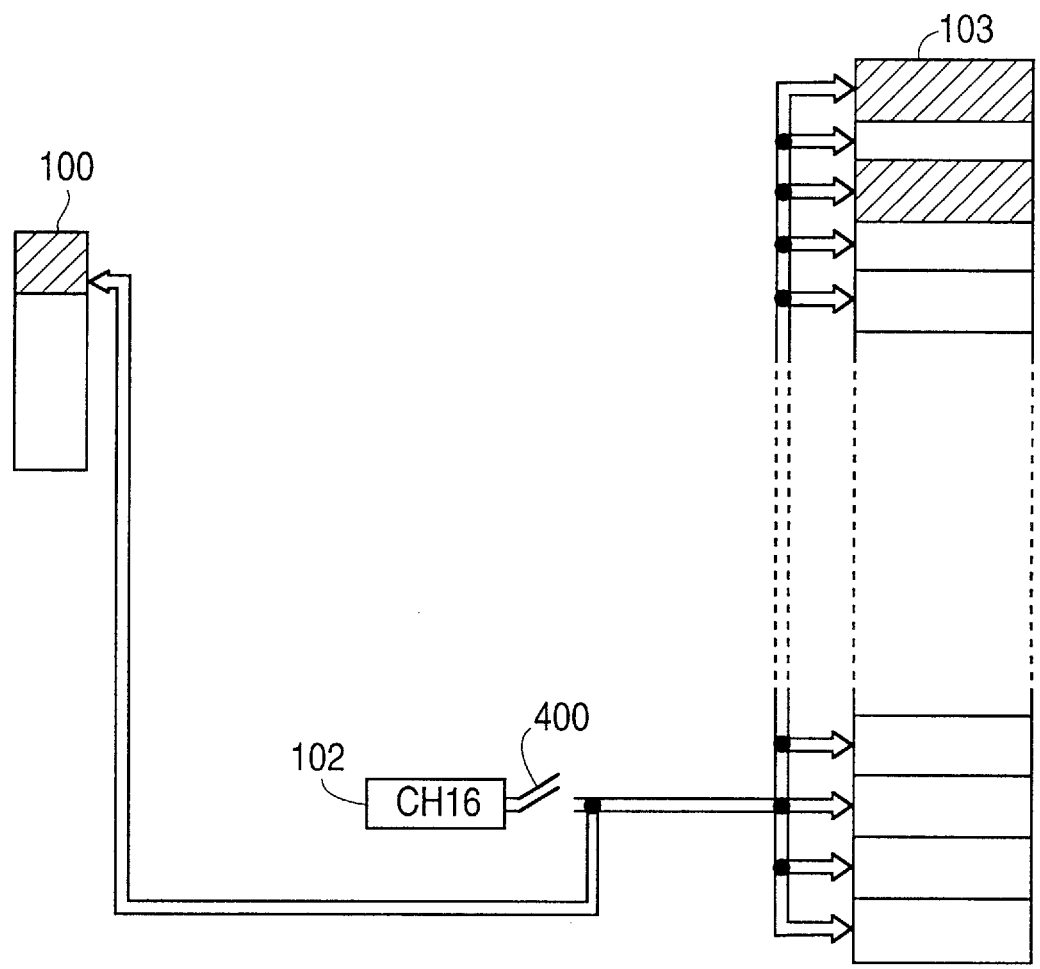
FIG. 4 shows a first schematic representation of a physical connection between an output portion of a channel of a conference trunk which is dedicated to making only information broadcasting calls and communication line switches.

FIG. 4 shows a first schematic representation of the physical connection between the channel CH16 of the output portion 102 of the conference trunk and the communication line switches 100 and 103 in which a single switch 400 is provided in common to all of the communication line switches 100 and 103.

Figure 5:
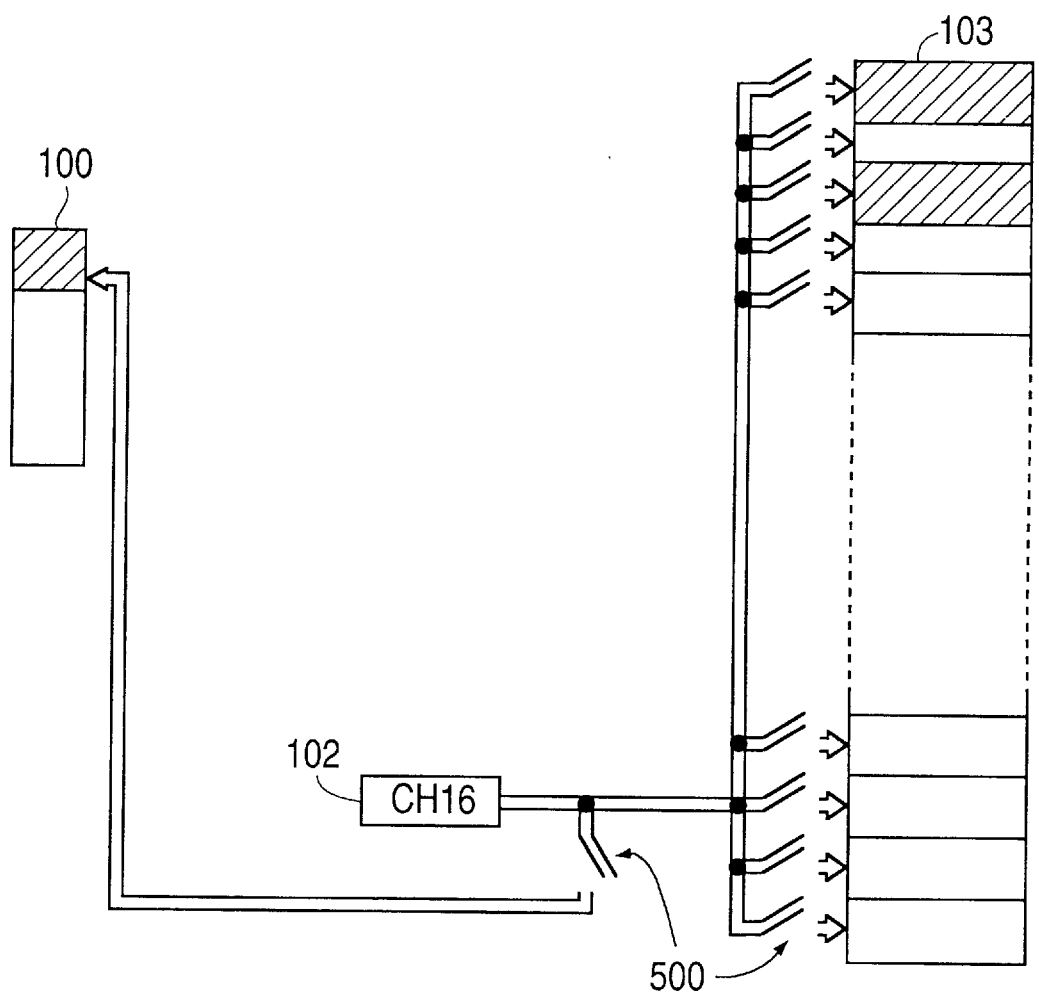
FIG. 5 shows a second schematic representation of a physical connection between an output portion of a channel of a conference trunk which is dedicated to making only information broadcasting calls and communication line switches.

FIG. 5 shows a second schematic representation of the physical connection between the channel CH16 of the output portion 102 of the conference trunk and the communication line switches 100 and 103 in which a plurality of switches 500 are provided, one for each of the communication line switches 100 and 103.

However, it is noted that FIGS. 4–5 merely show schematic representations, and it will be apparent to one of ordinary skill in the art that the actual physical connection between the channel CH16 of the output portion 102 of the conference trunk and the communication line switches 100 and 103 and means for controlling the physical connection can be implemented in a variety of well-known ways.

By closing the switch 400 in FIG. 4 or the switches 500 in FIG. 5 during an information broadcasting call and opening the switch 400 in FIG. 4 or the switches 500 in FIG. 5 during any other type of call, the system control circuit 110 can control the physical connection between the channel CH16 of the output portion 102 of the conference trunk and the communication line switches 100 and 103 such that a signal from the channel CH16 of the output portion 102 of the conference trunk will be transmitted to the communication line switches 100 and 103 only during an information broadcasting call, and will not be transmitted to the communication line switches 100 and 103 during any other type of call.

When the station 105 initiates an information broadcasting call, for example, when a user of the station 105 dials a special number assigned to information broadcasting calls, the station 105 initiating the information broadcasting call transmits an information broadcasting instruction to the system control circuit 110. When the system control circuit 110 receives the information broadcasting instruction, it interrupts any calls in which the stations 106 are already participating, connects the communication line switch 100 to which the station 105 is connected to the channel CH16 of the input portion 101 of the conference trunk via a vacant switching channel, controls the switches 201 of the adder 104-16 corresponding to the channel CH16 of the conference trunk such that the summer 200 of the adder 104-16 outputs only the signal from the channel CH16 of the input portion 101 of the conference trunk to the channel CH16 of the output portion 102 of the conference trunk, and controls the physical connection between the channel CH16 of the output portion 102 of the conference trunk and the communication line switches 100 and 103 to enable a signal from the channel CH16 of the output portion 102 of the conference trunk to be transmitted to all of the communication line switches 100 and 103, and transmits the information broadcasting instruction to all of the stations 105 and 106 through the channel CH16 of the output portion 102 of the conference trunk and the communication line switches 100 and 103.

When the station 105 which transmitted the information broadcasting instruction receives the information broadcasting instruction, it ignores the information broadcasting instruction.

When the stations 106 receive the information broadcasting instruction, they enter a broadcast information receiving state in which they are able to receive information broadcast from the station 105 as described below.

Once the stations 106 have entered the broadcast information receiving state, the station 105 begins broadcasting information, such as voice signals or data, to the stations 106 through the communication line switch 100, the channel CH16 of the input portion 101 of the conference trunk, the adder 104-16, the channel CH16 of the output portion 102 of the conference trunk, and the communication line switches 103.

Figure 6:
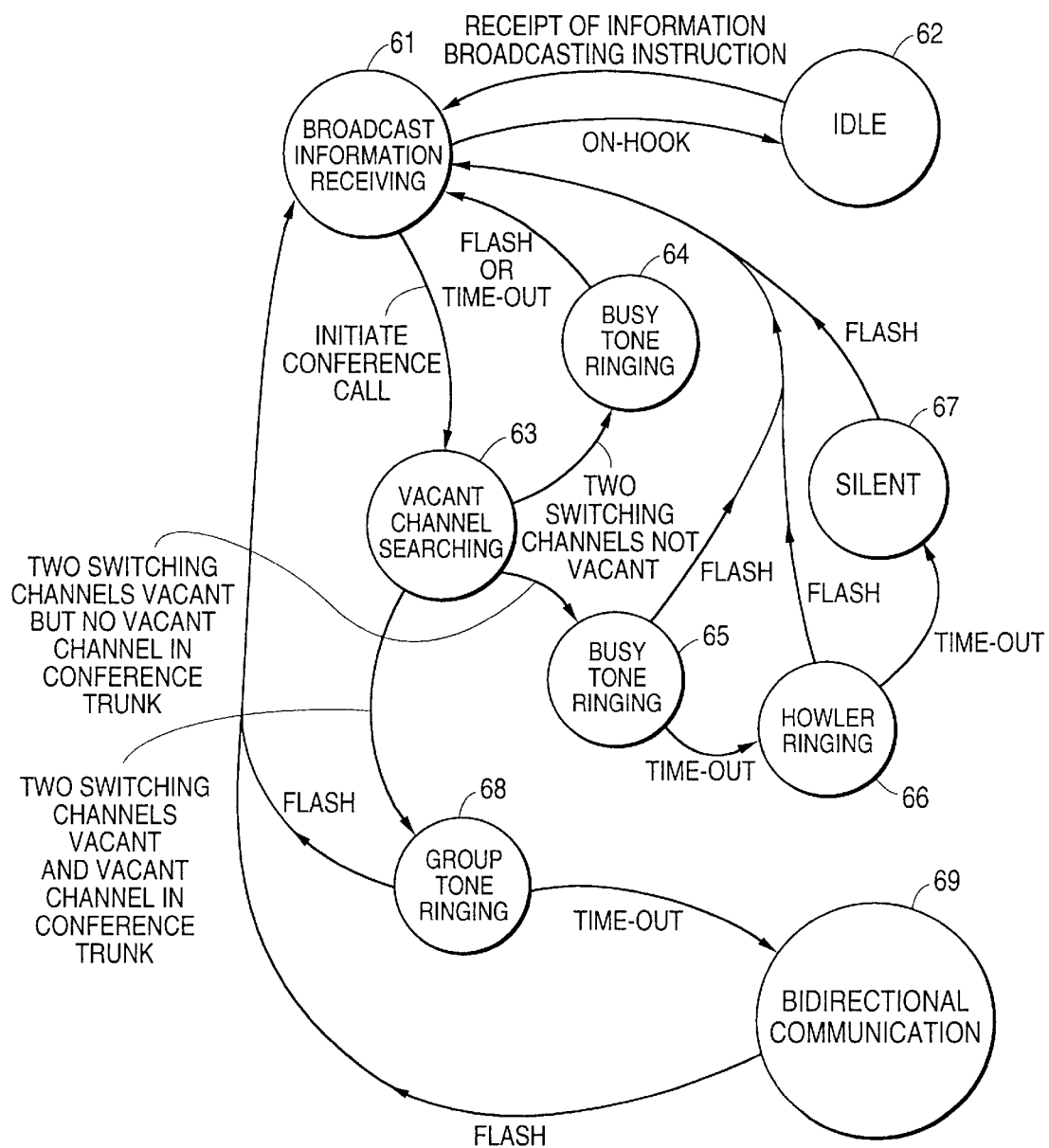
FIG. 6 shows a state transition diagram of a station to which information is being broadcast.

FIG. 6 shows a state transition diagram of the stations 106 to which the station 105 is broadcasting information.

When one of the stations 106 receives the information broadcasting instruction transmitted from the station 105, it enters a broadcast information receiving state 61 in which it is off-hook, thereby enabling it to receive information broadcast from the station 105.

If a user of the station 106 places the station on-hook (for example, by hanging up a handset of the station 106), the station 106 is disconnected from the system and enters an idle state 62. If the station 106 receives another information broadcasting instruction while it is in the idle state 62, it returns to the broadcast information receiving state 61.

While the station 106 is in the broadcast information receiving state 61, if the user of the station 106 wants to transmit information, he initiates a conference call, for example, by dialing a special number assigned to conference calls. The station 106 then enters a vacant channel searching state 63 in which the system control circuit 110 searches for two vacant switching channels with which it can connect the communication line switch 103 to which the station 105 is connected to the input portion 101 of the conference trunk and the output portion 102 of the conference trunk.

If the system control circuit 110 is unable to find two vacant switching channels while the station 106 is in the vacant channel searching state 63, the station 106 enters a busy tone ringing state 64, from which it returns to the broadcast information receiving state 61 either when the user of the station 106 performs a flashing operation or when a predetermined time has elapsed without the user performing the flashing operation. The flashing operation is well known in the art, and is an operation in which the station 106 is placed on-hook and then is placed off-hook again within a predetermined period of time, such as within 100 msec to 1 sec.

If the system control circuit 110 is able to find two vacant switching channels while the station 106 is in the vacant channel searching state 63, the station 106 remains in the vacant channel searching state 63 while the system control circuit 110 searches for a vacant channel in the conference trunk.

If the system control circuit 110 is unable to find a vacant channel in the conference trunk while the station 106 is in the vacant channel searching state 63, the station 106 enters a busy tone ringing state 65, from which it returns to the broadcast information receiving state 61 if the user performs the flashing operation within a predetermined time.

If the user does not perform the flashing operation within the predetermined time while the station 106 is in the busy tone ringing state 65, the station 106 enters a howler ringing state 66, and then returns to the broadcast information receiving state 61 if the user performs the flashing operation within a predetermined time.

If the user does not perform the flashing operation within the predetermined time when the station 106 is in the howler ringing state 66, the station 106 enters a silent state 67 in which it remains until the user performs the flashing operation, at which time the station 106 returns to the broadcast information receiving state 61.

If the system control circuit 110 is able to find a vacant channel in the conference trunk while the station 106 is in the vacant channel searching state 63, the station 106 enters a group tone ringing state 68, from which it returns to the broadcast information receiving state 61 if the user performs the flashing operation within a predetermined time.

If the user does not perform the flashing operation within the predetermined time when the station 106 is in the group tone ringing state 68, the station 106 enters a bidirectional communication state 69 in which it remains until the user performs the flashing operation, at which time it returns to the broadcast information receiving state 61.

The two stations 106 connected to the communication line switches 103 which are hatched in FIG. 1 are in the bidirectional communication state 69 shown in FIG. 6. One of the two stations 106 is connected to the channel CH1 of the input portion 101 of the conference trunk and the channel CH1 of the output portion 102 of the conference trunk via a respective one of the communication line switches 103 and respective vacant switching channels, and the other of the two stations 106 is connected to the channel CH2 of the input portion 101 of the conference trunk and the channel CH1 of the output portion 102 of the conference trunk via a respective one of the communication line switches 103 and respective vacant switching channels.

The adder 104-1 corresponding to the channel CH1 of the conference trunk adds together signals from only the channels CH2 and CH16 of the input portion 101 of the conference trunk and outputs the added signals to the channel CH1 of the output portion 102 of the conference trunk, the adder 104-2 corresponding to the channel CH2 of the conference trunk adds together signals from only the channels CH1 and CH16 of the input portion 101 of the conference trunk and outputs the added signals to the channel CH2 of the output portion 102 of the conference trunk, and the adder 104-16 corresponding to the channel CH16 of the conference trunk adds together signals from only the channels CH1, CH2, and CH16 of the input portion 101 of the conference trunk and outputs the added signals to the channel CH16 of the output portion 102 of the conference trunk.

The various communication paths provided by the connection shown in FIG. 1 enable the two stations 106 which are connected to the channels CH1 and CH2 of the conference trunk to communicate with one another while receiving broadcast information from the station 105, and to transmit information both to the station 105 as well as to all other ones of the stations 106 during the information broadcasting operation, thereby enabling bidirectional communication between these two stations 106 and the station 105 which is broadcasting information during the information broadcasting operation.

Thus, the circuit configuration in FIG. 1 enables bidirectional communication during an information broadcasting operation between the station 105 which is broadcasting information and a number of the stations 106 which is equal to the number of vacant channels in the conference trunk, thereby providing improved communications when the information broadcasting operation is used, such as during emergencies.

Once the two stations 106 which are connected to the channels CH1 and CH2 of the conference trunk return to the broadcast information receiving state 61 shown in FIG. 6, they are disconnected from the channels CH1 and CH2 of the conference trunk, making the channels CH1 and CH2 available for other ones of the stations 106 to use to engage in bidirectional communication while the station 105 is broadcasting information, thereby increasing the utilization of the system.

Figure 7:
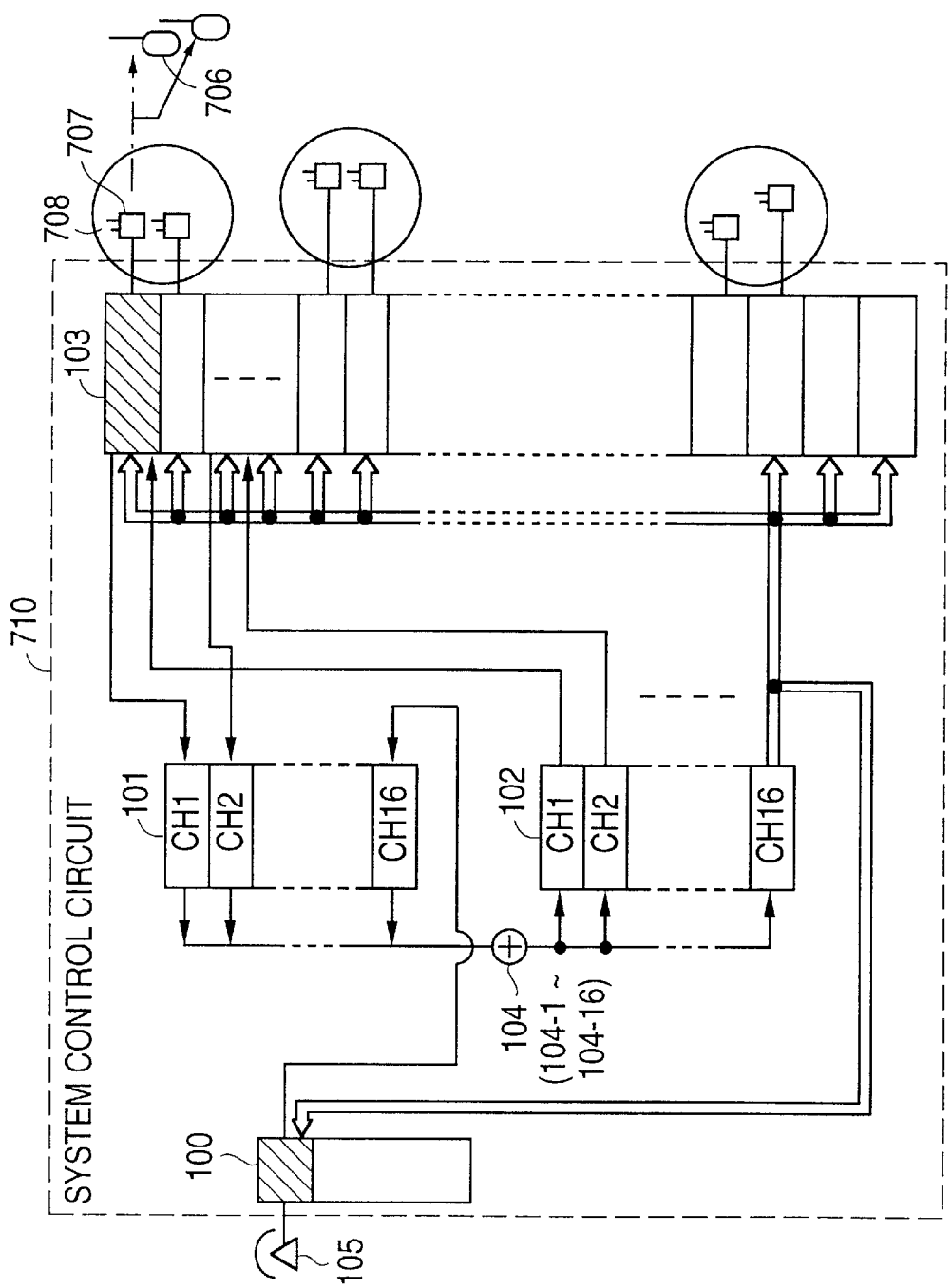
FIG. 7 shows an example of a circuit configuration for performing an information broadcasting method according to the present invention in a wireless analog mobile communication system.

FIG. 7 shows an example of a circuit configuration for performing an information broadcasting method according to the present invention in a wireless analog mobile communication system.

Elements 100–105 in the system in FIG. 7 are the same as the corresponding elements in the system in FIG. 1, and accordingly a description of these elements has been omitted.

In place of the stations 106 connected by wires to communication line switches 103 in the system in FIG. 1, the system in FIG. 7 includes base stations 707 located in cells 708 and connected by wires to the communication line switches 103, and mobile stations 706 which communicate with the base stations 707 via analog radio signals, for example. Each of the base stations 707 is connected to a respective one of the communication line switches 103.

Figure 9:
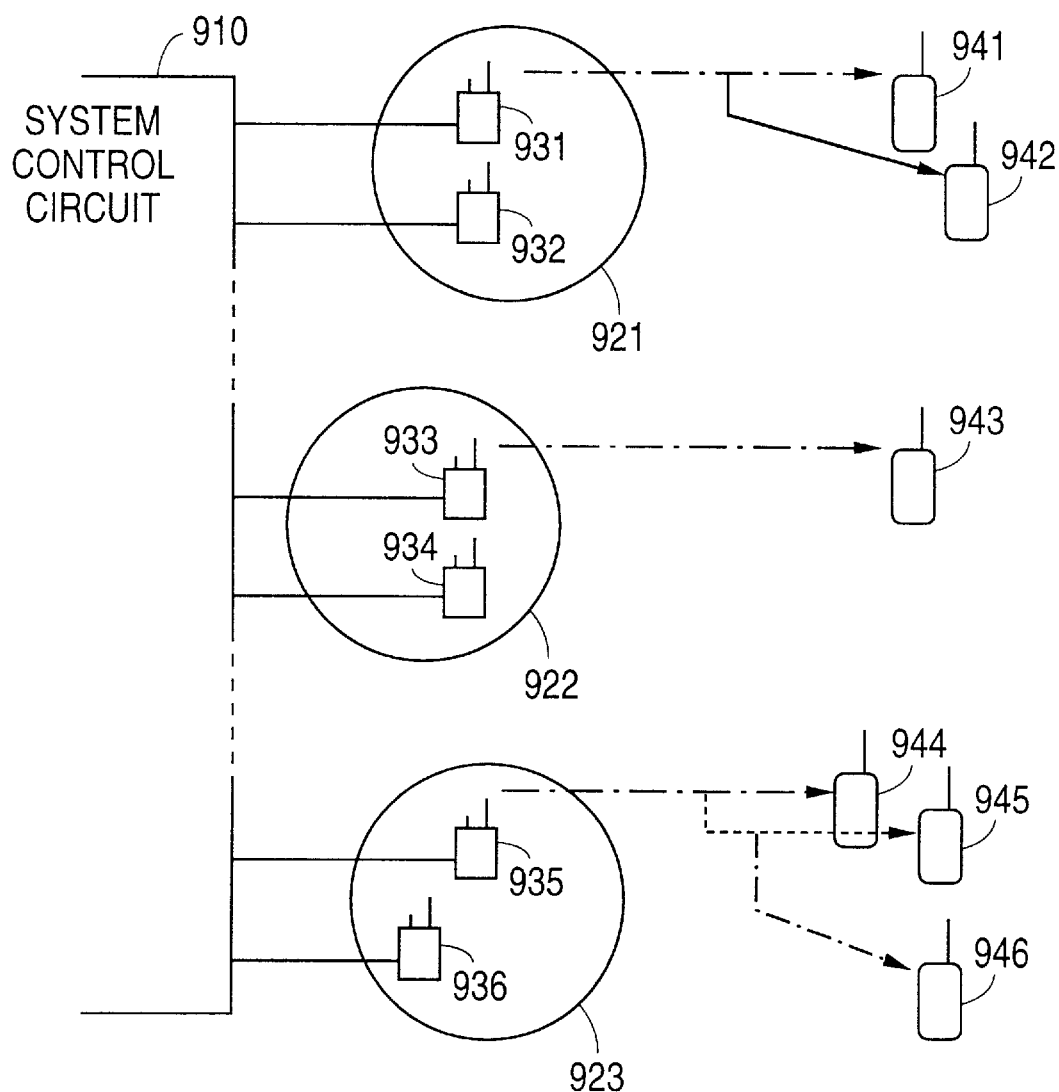
FIG. 9 shows a conventional wireless mobile communication system.

The system in FIG. 7 includes a system control circuit 710 which is similar to the system control circuit 110 in the system in FIG. 1, and which performs all of the functions performed by the system control circuit 110 in FIG. 1, together with additional functions which are required for operation of a wireless analog mobile communication system. Most of these additional functions are conventional, and some of them were described above in the description of the conventional wireless mobile communication system in FIG. 9.

In the system in FIG. 7, when a normal two-way call is placed to one of the mobile stations 706, a telephone number of the mobile station 706 being called is transmitted to the system control circuit 710. When the system control circuit 710 receives the telephone number, it obtains an identification code (ID code) of the mobile station 706 being called corresponding to the telephone number from a conventional table, determines which one of the cells 708 the mobile station 706 being called is located in from a conventional position register circuit, and transmits the ID code of the mobile station 706 being called to one of the base stations 707 located in that cell 708 through a corresponding one of the communication line switches 103. That base station 707 transmits a call signal including the ID code of the mobile station 706 being called from an antenna. Each of the mobile stations 706 in the cell 708 in which the mobile station 706 being called is located receives the call signal, but only the mobile station 706 being called recognizes its ID code and responds to the call.

Information broadcasting calls are made in the system in FIG. 7 in substantially the same manner in which they are made in the system in FIG. 1. However, one difference in the system in FIG. 7 is that when the system control circuit 710 receives the information broadcasting instruction from the station which is initiating the information broadcasting call, it transmits a special code assigned to information broadcasting calls to all of the base stations 707 through the channel CH16 of the output portion 102 of the conference trunk and the communication line switches 103. Each of the base stations 707 transmits a call signal including the special code from an antenna. Each of the mobile stations 706 receives the call signal, recognizes the special code, and receives the information broadcasting instruction which is transmitted by the system control circuit 710 through the channel CH16 of the output portion 102 of the conference trunk, the communication line switches 103, and the base stations 707.

When the mobile stations 706 receive the information broadcasting instruction, they enter the broadcast information receiving state 61 shown in FIG. 6. The state transition diagram for the system in FIG. 7 is essentially the same as the one in FIG. 6 which is for the system in FIG. 1. However, one difference in the state transition diagram for the system in FIG. 7 is that when a mobile station 706 is in the vacant channel searching state 63 shown in FIG. 6, the system control circuit 710 must also search for a vacant radio channel in a cell 708 with which a mobile station 706 in the cell 708 can communicate with a base station 707 in the cell 708.

Figure 8:
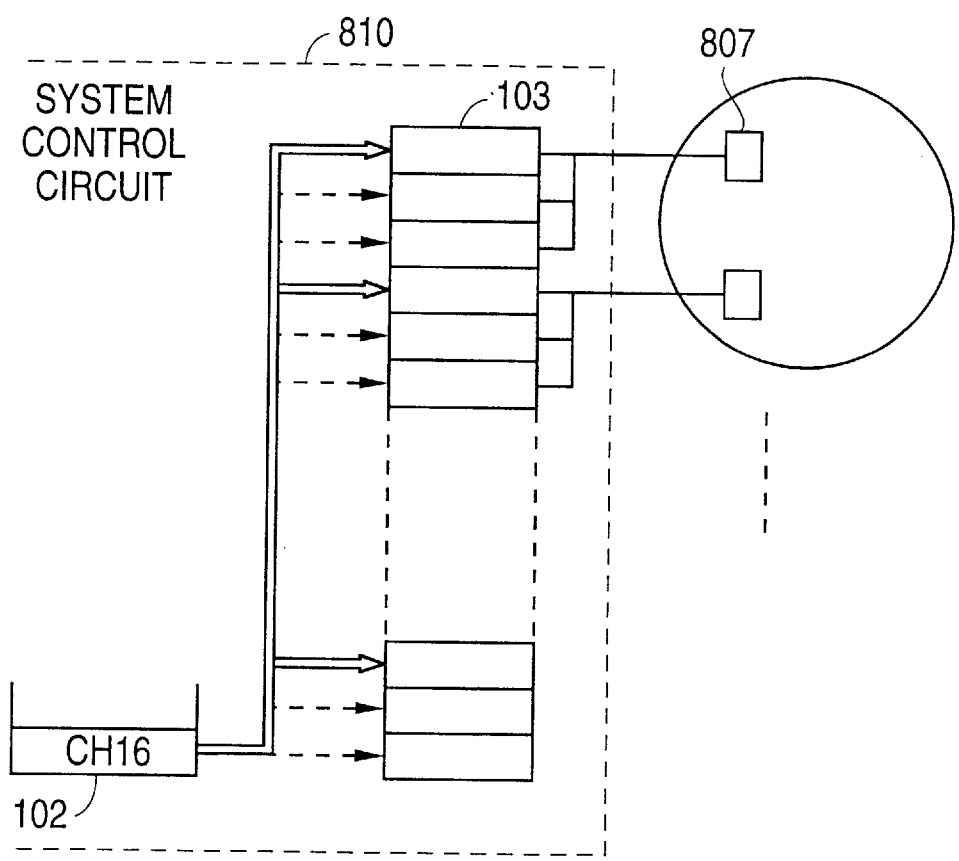
FIG. 8 shows an example of a circuit configuration for performing an information broadcasting method according to the present invention in a wireless digital mobile communication system.

FIG. 8 shows an example of a circuit configuration for performing an information broadcasting method according to the present invention in a wireless digital mobile communication system.

The system in FIG. 8 has many of the same elements as the system in FIG. 7 and operates in substantially the same way, and accordingly the elements the two systems have in common have been omitted from FIG. 8, and a detailed description of the operation of the system in FIG. 8 has been omitted.

The primary differences between the system in FIG. 8 and the system in FIG. 7 are that the system in FIG. 8 includes base stations 807 which communicate with mobile stations via digital radio signals, for example, and each of the base stations 807 is connected to three of the communication line switches 103, thereby providing three circuits connected to each of the base stations 807.

The system in FIG. 8 includes a system control circuit 810 which is similar to the system control circuit 710 in the system in FIG. 7, and which performs all of the functions performed by the system control circuit 710 in FIG. 7, together with additional functions which are required for operation of a wireless digital mobile communication system. Most of these additional functions are conventional, and some of them were described above in the description of the conventional wireless mobile communication system in FIG. 9 and the wireless analog mobile communication system in FIG. 7.

However, in the system in FIG. 8, the system control circuit 810 must search for a vacant one of the three circuits connected to a base station 807 when making normal two-way calls, conference calls, and information broadcasting calls. Also, when a mobile station is in the vacant channel searching state 63 shown in FIG. 6, the system control circuit 810 must also search for a vacant one of the three circuits connected to a base station 807.

The systems in FIGS. 7–8 can be connected to a public communication network in the manner described above with respect to FIG. 9.

As described above, the present invention provides an information broadcasting method which enables bidirectional communication during an information broadcasting operation between a station receiving broadcast information and a station which initiated the information broadcasting operation, and enables two stations which are receiving broadcast information to communicate with one another during the information broadcasting operation.

Although the present invention has been described in some detail with respect to several specific embodiments, the present invention is not limited to these embodiments, but includes various modifications of these embodiments which will be apparent to one of ordinary skill in the art. Accordingly, the scope of the present invention is to be determined only on the basis of the claims.

What is claimed is:

1. An information broadcasting met hod for a communication system including a plurality of stations, the communication system enabling any two of the stations to communicate with one another, the information broadcasting method comprising the steps of:

providing the communication system with a conference trunk having at least four channels, each of the channels having an input and an output normally unconnected to the input;

assigning one of the channels to be an information broadcasting channel for use only in information broadcasting wherein any one of the stations broadcasts information to all of the stations simultaneously via the information broadcasting channel after the one station issues an information broadcasting instruction;

assigning all other ones of the channels to be conference communication channels for use in conference communication wherein any three or more of the stations communicate with one another simultaneously via any three or more of the conference communication channels after any one of the three or more stations issues a conference communication instruction;

issuing the information broadcasting instruction from any one of the stations;

connecting the station which issued the information broadcasting instruction to the input of the information broadcasting channel in response to the information broadcasting instruction;

connecting the output of the information broadcasting channel to the input of the information broadcasting channel in response to the information broadcasting instruction;

connecting all of the stations to the output of the information broadcasting channel in response to the information broadcasting instruction, thereby connecting the station which issued the information broadcasting instruction to all of the stations via the information broadcasting channel;

broadcasting information from the station which issued the information broadcasting instruction to all of the stations via the information broadcasting channel;

issuing a conference communication instruction from any one of the stations except the station which issued the information broadcasting instruction while the station which issued the information broadcasting instruction is broadcasting information to all of the stations;

connecting the station which issued the conference communication instruction to the output of the information broadcasting channel in response to the conference communication instruction, thereby connecting the station which issued the conference communication instruction to all of the stations via the information broadcasting channel; and transmitting information from the station which issued the conference communication request to all of the stations via the information broadcasting channel, thereby engaging in bidirectional communication with the station which issued the information broadcasting instruction while the station which issued the information broadcasting instruction is broadcasting information to all of the stations.

2. An information broadcasting method according to claim 1, wherein the step of connecting the station which issued the conference communication instruction to the output of the information broadcasting channel includes the steps of:

connecting the station which issued the conference communication request to the input of a vacant one of the conference communication channels in response to the conference communication request; and connecting the output of the information broadcasting channel to the input of the vacant conference communication channel in response to the conference communication request.

3. An information broadcasting method according to claim 2, further comprising the steps of:

connecting the station which issued the conference communication request to the output of the vacant conference communication channel in response to the conference communication request; and connecting the output of the vacant conference communication channel to the input of the information broadcasting channel in response to the conference communication request.

4. An information broadcasting method according to claim 1, wherein the station issuing the information broadcasting instruction issues it when a user of the station dials a special number assigned to information broadcasting.

5. An information broadcasting method according to claim 1, wherein the station issuing the conference communication instruction issues it when a user of the station dials a special number assigned to conference communication.

6. An information broadcasting method according to claim 1, wherein the communication system is a wireless mobile communication system including a plurality of base stations and a plurality of mobile stations;

wherein the step of connecting all of the stations to the output of the information broadcasting channel includes the steps of connecting all of the base stations to the output of the information broadcasting channel in response to the information broadcasting instruction, and connecting each of the mobile stations to one of the base stations in response to the information broadcasting instruction;

wherein the station which issued the conference communication instruction is one of the mobile stations connected to one of the base stations; and wherein the step of connecting the station which issued the conference communication instruction to the output of the information broadcasting channel includes the step of connecting the base station to which the mobile station which issued the conference communication instruction is connected to the output of the information broadcasting channel in response to the conference communication instruction.

7. An information broadcasting method for a first communication system and a second communication system each including a plurality of stations, the first communication system being connected to the second communication system, the first communication system and the second communication system enabling any two of the stations in the first communication system and the second communication system to communicate with one another, the information broadcasting method comprising the steps of:

providing the first communication system with a conference trunk having at least four channels, each of the channels having an input and an output normally unconnected to the input;

assigning one of the channels to be an information broadcasting channel for use only in information broadcasting wherein any one of the stations in the second communication system broadcasts information to all of the stations in the first communication system simultaneously via the information broadcasting channel after the one station issues an information broadcasting instruction;

assigning all other ones of the channels to be conference communication channels for use in conference communication wherein any three or more of the stations in the first communication system communicate with one another simultaneously via any three or more of the conference communication channels after any one of the three or more stations issues a conference communication instruction;

issuing the information broadcasting instruction from any one of the stations in the second communication system;

connecting the station in the second communication system which issued the information broadcasting instruction to the input of the information broadcasting channel in response to the information broadcasting instruction;

connecting the output of the information broadcasting channel to the input of the information broadcasting channel in response to the information broadcasting instruction;

connecting the station in the second communication system which issued the information broadcasting instruction and all of the stations in the first communication system to the output of the information broadcasting channel in response to the information broadcasting instruction, thereby connecting the station in the second communication system which issued the information broadcasting instruction to all of the stations in the first communication system via the information broadcasting channel;

broadcasting information from the station in the second communication system which issued the information broadcasting instruction to all of the stations in the first communication system via the information broadcasting channel;

issuing a conference communication instruction from any one of the stations in the first communication system while the station in the second communication system which issued the information broadcasting instruction is broadcasting information to all of the stations in the first communication system;

connecting the station in the first communication system which issued the conference communication instruction to the output of the information broadcasting channel in response to the conference communication instruction, thereby connecting the station in the first communication system which issued the conference communication instruction to the station in the second communication system which issued the information broadcasting instruction and to all of the stations in the first communication system via the information broadcasting channel; and transmitting information from the station in the first communication system which issued the conference communication request to the station in the second communication system which issued the information broadcasting instruction and to all of the stations in the first communication system via the information broadcasting channel, thereby engaging in bidirectional communication with the station in the second communication system which issued the information broadcasting instruction while the station in the second communication system which issued the information broadcasting instruction is broadcasting information to all of the stations in the first communication system.

8. An information broadcasting method according to claim 7, wherein the step of connecting the station in the first communication system which issued the conference communication instruction to the output of the information broadcasting channel includes the steps of:

connecting the station in the first communication system which issued the conference communication request to the input of a vacant one of the conference communication channels in response to the conference communication request; and connecting the output of the information broadcasting channel to the input of the vacant conference communication channel in response to the conference communication request.

9. An information broadcasting method according to claim 8, further comprising the steps of:

connecting the station in the first communication system which issued the conference communication request to the output of the vacant conference communication channel in response to the conference communication request; and connecting the output of the vacant conference communication channel to the input of the information broadcasting channel in response to the conference communication request.

10. An information broadcasting method according to claim 7, wherein the station in the second communication system issuing the information broadcasting instruction issues it when a user of the station dials a special number assigned to information broadcasting.

11. An information broadcasting method according to claim 7, wherein the station in the first communication system issuing the conference communication instruction issues it when a user of the station dials a special number assigned to conference communication.

12. An information broadcasting method according to claim 7, wherein the first communication system is a wireless mobile communication system including a plurality of base stations and a plurality of mobile stations;

wherein the step of connecting the station in the second communication system which issued the information broadcasting instruction and all of the stations in the first communication system to the output of the information broadcasting channel includes the steps of connecting all of the base stations in the first communication system to the output of the information broadcasting channel in response to the information broadcasting instruction, and connecting each of the mobile stations in the first communication system to one of the base stations in the first communication system in response to the information broadcasting instruction;

wherein the station in the first communication system which issued the conference communication instruction is one of the mobile stations in the first communication system connected to one of the base stations in the first communication system; and wherein the step of connecting the station in the first communication system which issued the conference communication instruction to the output of the information broadcasting channel includes the step of connecting the base station in the first communication system to which the mobile station in the first communication system which issued the conference communication instruction is connected to the output of the information broadcasting channel in response to the conference communication instruction.

13. An information broadcasting method according to claim 12, wherein the second communication system is a public communication system.

14. An information broadcasting method according to claim 12, wherein the second communication system is a private communication system.

* * * * *